(12) United States Patent
Rivet et al.

(10) Patent No.: US 8,891,265 B2
(45) Date of Patent: Nov. 18, 2014

(54) OVERVOLTAGE LIMITATION IN A SWITCH-MODE CONVERTER

(75) Inventors: Bertrand Rivet, Vouvray (FR); Aurélien Hamadou, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 222 days.

(21) Appl. No.: 12/989,998

(22) PCT Filed: May 12, 2009

(86) PCT No.: PCT/FR2009/050864
§ 371 (c)(1),
(2), (4) Date: Nov. 29, 2010

(87) PCT Pub. No.: WO2009/147343
PCT Pub. Date: Dec. 10, 2009

(65) Prior Publication Data
US 2011/0063876 A1 Mar. 17, 2011

(30) Foreign Application Priority Data
May 13, 2008 (FR) .................... 08 53080

(51) Int. Cl.
*H02M 3/335* (2006.01)
*H02M 1/34* (2007.01)

(52) U.S. Cl.
CPC ............... *H02M 3/335* (2013.01); *H02M 1/34* (2013.01); *H02M 2001/344* (2013.01)

USPC .................... 363/53; 363/21.04; 363/126

(58) Field of Classification Search
USPC .......... 363/21.04, 21.02, 145, 26, 222, 21.01, 363/21.03, 21.05, 21.06, 22, 25, 52, 53, 363/125, 126, 127; 323/22, 25
See application file for complete search history.

(56) References Cited

U.S. PATENT DOCUMENTS 3,815,015 A * 6/1974 Swin et al. .................. 323/267
4,368,409 A * 1/1983 Sivanesan et al. ............ 315/411

(Continued)

FOREIGN PATENT DOCUMENTS

DE 3639495 A1 5/1988

OTHER PUBLICATIONS

English language translation of the International Preliminary Examination Report dated Dec. 29, 2010 from corresponding International Application No. PCT/FR2009/050864.

(Continued)

*Primary Examiner* — Gary L Laxton
*Assistant Examiner* — Trinh Dang
(74) *Attorney, Agent, or Firm* — Allen, Dyer, Doppelt, Milbrath & Gilchrist, P.A.

(57) ABSTRACT

A switch-mode converter including an inductive transformer having a secondary winding associated with at least one first switch, including, in parallel with the first switch, at least one first diode in series with a capacitive element; and in parallel with the capacitive element, an active circuit for limiting the voltage thereacross.

16 Claims, 3 Drawing Sheets

(56) References Cited

U.S. PATENT DOCUMENTS

| | | | |
|---|---|---|---|
| 4,384,214 A * | 5/1983 | Crick et al. | 307/66 |
| 5,943,225 A | 8/1999 | Park | |
| 6,201,375 B1 * | 3/2001 | Larson et al. | 323/277 |
| 6,256,385 B1 * | 7/2001 | Courtois | 379/413 |
| 6,359,420 B1 * | 3/2002 | Hitchcock | 320/141 |
| 6,756,839 B2 * | 6/2004 | Hall et al. | 327/538 |
| 7,274,176 B2 * | 9/2007 | Mihara | 323/269 |
| 2003/0090919 A1 * | 5/2003 | Merceron et al. | 363/145 |
| 2006/0158127 A1 | 7/2006 | Xu | |
| 2007/0035971 A1 * | 2/2007 | Yasumura | 363/21.02 |

OTHER PUBLICATIONS

International Search Report dated Oct. 14, 2010 from corresponding PCT Application No. PCT/FR2009/050864.

\* cited by examiner

OVERVOLTAGE LIMITATION IN A SWITCH-MODE CONVERTER

CROSS REFERENCE TO RELATED APPLICATIONS

This application is a U.S. National Stage Patent Application based on PCT Application Number PCT/FR2009/050864, filed on May 12, 2009, entitled "Overvoltage Limitation in a Chopping Converter", which application claims the priority benefit of French patent application number 08153080, filed on May 13, 2008, entitled "Overvoltage Limitation in a Chopping Converter," which applications are hereby incorporated by reference to the maximum extent allowable by law.

BACKGROUND OF THE INVENTION

1. Field of the Invention

The present invention generally relates to electronic circuits and, more specifically, to switch-mode power supply circuits using a transformer.

2. Discussion of the Related Art

In switch-mode power supplies which use a transformer, one or several static switches (for example, a free wheel diode) present at the transformer secondary can generate voltage peaks while they are turned off (opened) due to a so-called charge recovery phenomenon. The switch needs to stand such reverse overvoltages. Now, the more the switch stands the reverse voltage, the greater its forward voltage drop, and thus the lower the efficiency of the converter.

It has already been provided to connect, in parallel with a free wheel diode, a capacitive element in series with a resistor. Such a series connection is used to filter overvoltages as the diode is turned off. However, such circuits (generally called "snubbers") are not adaptable and are set on manufacturing. Further, for circuits intended for high power (from a few watts to a few kilowatts), such protections generate significant losses.

U.S. Pat. No. 5,943,225 discloses a switch-mode converter having a passive element (resistor) in parallel with a capacitive element, said capacitive element being in series with a diode.

DE 3639495 A1 discloses a circuit for reducing switching losses and not for limiting overvoltages. An active element of the circuit needs an external control signal depending on the conduction periods.

SUMMARY OF THE INVENTION

It would be desirable to protect circuits connected downstream of a switch-mode power supply circuit against reverse overvoltages, in particular linked to the turning off of a static switch.

It would also be desirable to have a solution that can be integrated.

To achieve all or part of these objects as well as others, at least one embodiment of the present invention provides a switch-mode converter comprising an inductive transformer having a secondary winding associated with at least one first switch, comprising:

in parallel with the first switch, at least one first diode in series with a capacitive element; and in parallel with said capacitive element, an active circuit for limiting the voltage thereacross.

According to an embodiment of the converter, said active circuit comprises:

a transistor in parallel with the capacitive element; and an amplifier of data representative of the voltage across the capacitive element and for controlling the transistor.

According to an embodiment, a first input of the amplifier is coupled to a midpoint of a resistive dividing bridge coupled in parallel with the capacitive element, a second input of the amplifier being connected, by a voltage source, to one of the terminals of the capacitive element.

According to an embodiment, the transistor is a bipolar transistor having its collector and emitter coupled across the capacitive element and having a base coupled to the output of the comparator.

According to an embodiment, said first switch is in series with said secondary winding between two output terminals of the converter.

According to an embodiment, a second switch is in series with said secondary winding between two output terminals of the converter, said first switch being coupled in parallel with this series association.

According to an embodiment, a second diode connects the junction point of the secondary winding and of the second switch to the junction point of the capacitive element and of the first diode.

The foregoing objects, features, and advantages of the present invention will be discussed in detail in the following non-limiting description of specific embodiments in connection with the accompanying drawings.

DETAILED DESCRIPTION

Figure 1:
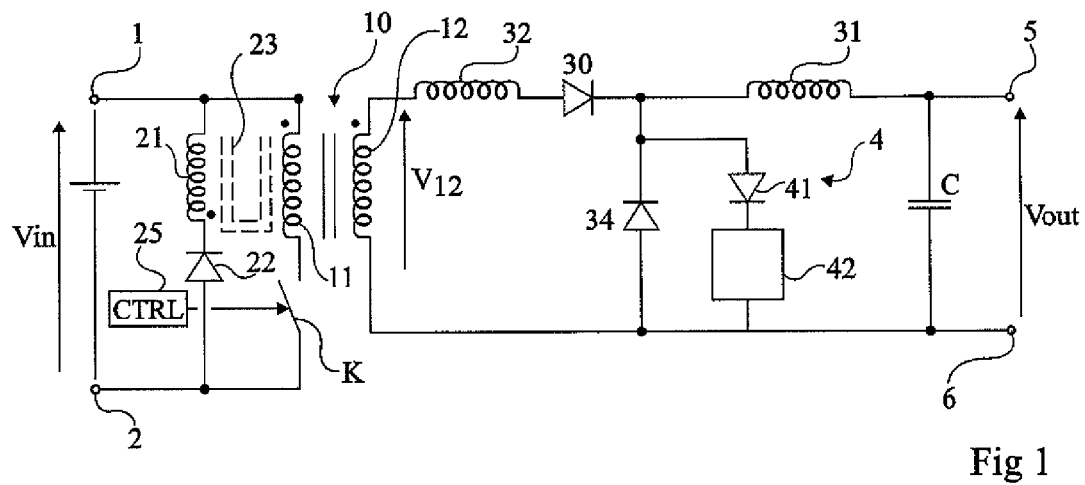
FIG. 1 schematically shows an embodiment of a switch-mode converter.

The same elements have been designated with the same reference numerals in the different drawings. For clarity, only those elements which are useful to the understanding of the present invention have been shown and will be described. In particular, the destination of the voltage generated by the switch-mode power supply has not been detailed, the present invention being compatible with any usual application of such a voltage.

FIG. 1 schematically shows an embodiment of a forward type switch-mode converter. Such a converter is based on the use of a transformer 10 having a primary winding 11 powered, at the rate of the switching of a cut-off switch K, by a D.C. voltage Vin applied between two input terminals 1 and 2. In the example of FIG. 1, primary winding 11 is in series with switch K between terminals 1 and 2. An assembly in which switch K is in parallel with winding 11 may also be provided. Switch K is controlled by a circuit 25 (CTRL) setting its switching frequency, for example, from several tens of kilohertz to a few hundreds of kilohertz, and the duty cycle of the control pulses. A demagnetization circuit preferably comprising an inductive element 21 in series with a diode 22 between terminals 1 and 2 is associated with the transformer primary, the anode of diode 22 being on the side of terminal 2 of application of the lower potential (for example, the ground) of voltage Vin. Winding 21 is inductively coupled (coupling illustrated by a dotted line 23) to primary winding 11. The respective phase points of windings 11 and 21 are inverted.

At the secondary of transformer 10, a secondary winding 12 having a phase point on the same side as primary winding 11 is used to recover the power transferred at the rate of the switching of switch K. Winding 12 is in series with a diode 30 and an inductive element 31 between two output terminals 5 and 6 of the converter, intended to provide a D.C. voltage Vout. The anode of diode 30 is on the side of winding 12. A capacitive smoothing element C connects terminals 5 and 6. In FIG. 1, a fictitious inductance 32 representing the leakage inductance of winding 12 has been illustrated in series with winding 12.

A free wheel diode 34 connects the cathode of diode 30 to ground 6 of the secondary. Diode 34 needs to, in reverse, stand a voltage generally called plateau voltage, linked to the ratio of the number of spirals between windings, to input voltage Vin, and to the mode switching duty cycle. In practice, a security margin of approximately 20% is taken. However, as it is switched on, overvoltages (here, negative) appear beyond this plateau voltage. To decrease such overvoltages, it is provided to connect, in parallel with diode 34, a circuit 4 for limiting its reverse voltage.

Figure 2:
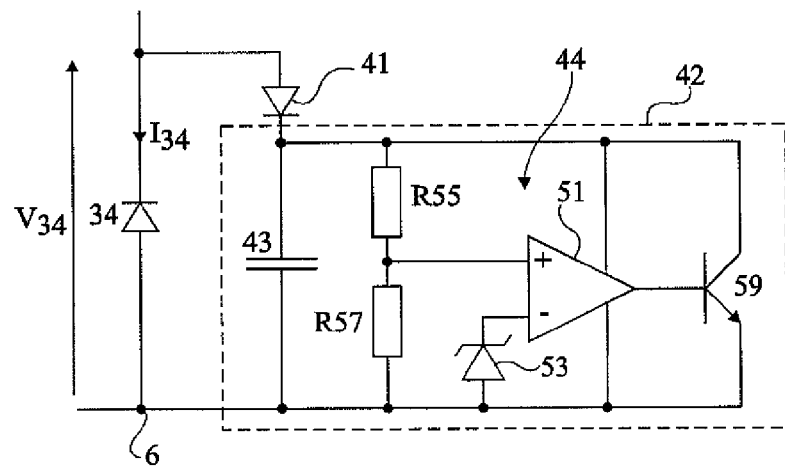
FIG. 2 shows a detail of the circuit of FIG. 1.

FIG. 2 illustrates an embodiment of limiting circuit 4. A capacitive element 43 is in parallel with an active circuit 44 for limiting the voltage thereacross. Active circuit 44 comprises an amplifier 51 having an input (for example, inverting) receiving a voltage reference, for example provided by a zener diode 53, and having another input (for example, non-inverting) connected to the midpoint of a resistive dividing bridge formed of two resistors R55 and R57 in series, coupled across capacitive element 43. The output of amplifier 51 controls the base of an NPN-type bipolar transistor 59, also in parallel with capacitive element 43. The emitter of transistor 59 is connected to ground 6 and its collector is connected to the cathode of diode 41. Amplifier 51 controls transistor 59 in a linear state. The power supply of amplifier 51 is provided by capacitive element 43.

Figure 3:
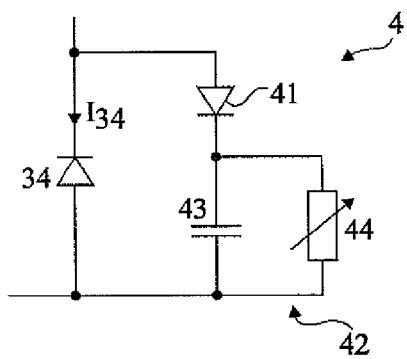
FIG. 3 shows a detail of the circuit of FIG. 1 illustrating another embodiment.

FIG. 3 illustrates the functional equivalent of circuit 44. This amounts to connecting, in parallel with capacitive element 43, a variable resistor 44.

The sum of the values of resistors R55 and R57 sets the voltage across capacitance 43. The ratio of their values is selected according to the arbitrarily-set threshold voltage of zener diode 53. Diode 53 behaves as a voltage source at its threshold level. The voltage across capacitive element 43 is selected to be smaller than or equal to the plateau voltage. This choice results from a compromise between the acceptable power dissipation and the quality of the filtering of overvoltages. The closer the voltage is to the positive supply voltage, the more the circuit dissipates, but the better it filters the overvoltage.

Figure 4A:
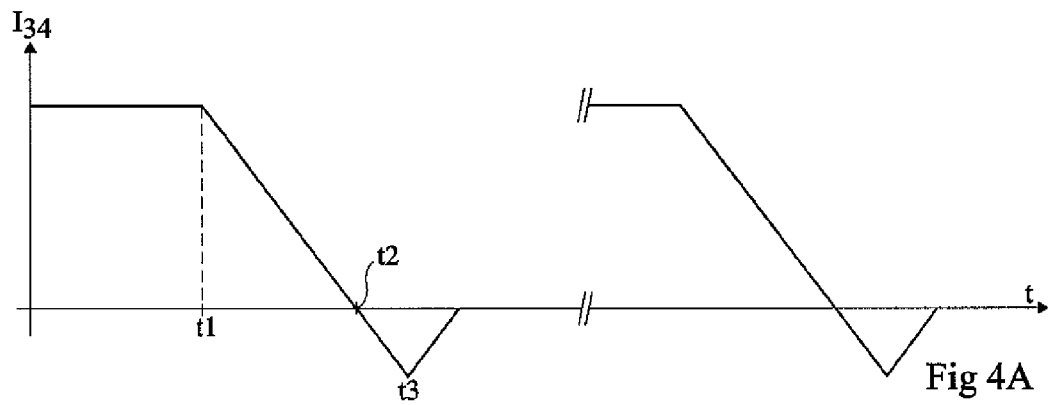
FIGS. 4A, 4B, and 4C are timing diagrams illustrating the operation of the protection circuit.
Figure 4B:
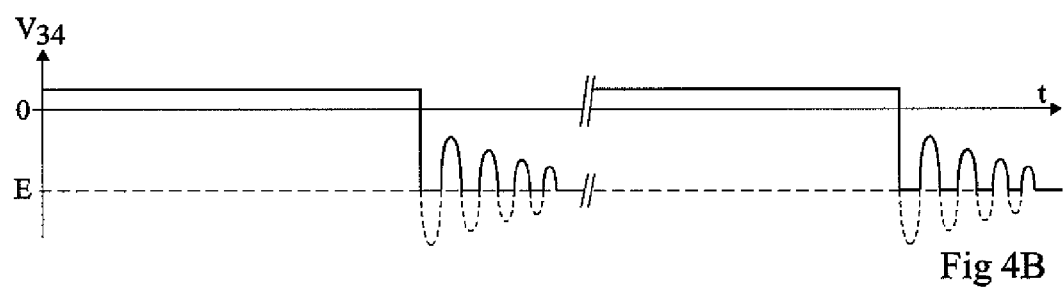
Figure 4C:
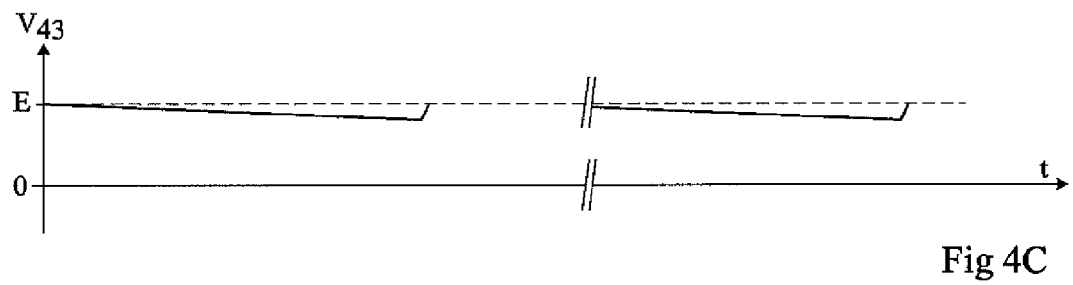

FIGS. 4A, 4B, and 4C are timing diagrams illustrating the operation of the circuit of FIG. 2. FIG. 4A illustrates an example of the shape of current $I_{34}$ in diode 34 when it is turned on. FIG. 4B illustrates the corresponding shape of voltage $V_{34}$ across this diode. FIG. 4C illustrates the corresponding shape of voltage $V_{43}$ across capacitive element 43 of the limiting circuit. In this example, it is assumed that the voltage is equal to plateau voltage E, set by resistors R55 and R57.

At the end of each conduction period of diode 43 (time t1), the current therein starts decreasing with a slope corresponding to the ratio of voltage $V_{12}$ across secondary winding 12 divided by value $L_{32}$ of leakage inductance 32. The current in the diode reverses at a time t2 when the charge recovery phenomenon starts. At a time t3 when current $I_{34}$ starts increasing again to evacuate the recovered charges, voltage $V_{34}$ across the diode abruptly reverses. FIG. 4B illustrates a negative level E corresponding to the plateau voltage. This level corresponds to the level (representing the inverse of the voltage across secondary winding 12) at which the reverse voltage of diode 34 settles until its next switching.

In the applications more specifically aimed at, the plateau voltage is of several tens of volts and overvoltages can exceed some hundred volts.

With no protection circuit, negative voltage peaks (illustrated in dotted lines in FIG. 4B), much lower than voltage E, appear after time t3. These peaks require usually sizing diode 34 so that it can withstand such reverse overvoltages.

Due to circuit 4, and as illustrated in FIGS. 4B and 4C, at time t3, the protection circuit activates and makes transistor 59 strongly conductive, which enables absorbing negative peaks. Thus, the reverse voltage across diode 34 is limited to voltage E or to a smaller voltage set by R55/R57.

As illustrated in FIG. 4C, the voltage across capacitor 43 decreases, from voltage E, during each conduction period of diode 34, until time t3 where it increases by power transfer from inductance 32. At time t3, capacitance 43 charges with the power stored in leakage inductance 32. The value of element 43 sets the variation of voltage $V_{43}$ thereacross. The level reached by voltage $V_{43}$ at the end of the discharge of leakage inductance 32 depends, among other things, on the reverse current in diode 34.

A protection circuit such as illustrated enables accurately setting the voltage at which the circuit is protected. Further, the generated losses are smaller than that of a series resistive and capacitive circuit. The power dissipation occurs in transistor 59 which has less losses than a series resistive element.

Further, the circuit adapts by itself to the operation of the application (temperature, charge, etc.).

Moreover, the protection circuit elements are integrable.

Figure 5:
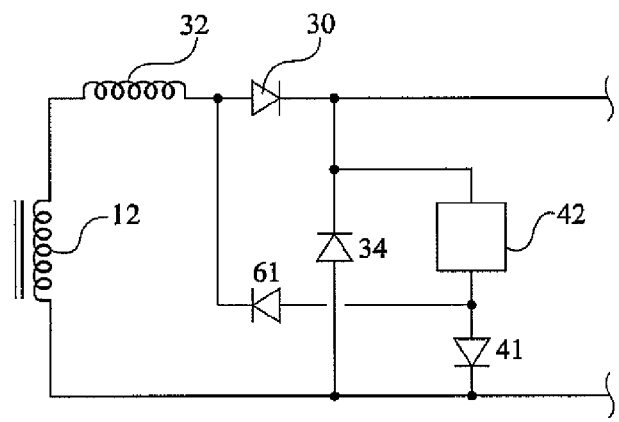
FIG. 5 partially shows another embodiment of a switch-mode converter.

FIG. 5 partially shows another embodiment applied to the protection of diodes 30 and 34. In this case, the positions of circuit 42 and of diode 41 are inverted and an additional diode 61 connects the anode of diode 41 to the anode of diode 30. Diode 61 enables limiting overvoltages at the turning-off of diode 60, by taking advantage of the same circuit 42. The operation of the assembly of FIG. 5 can be induced from that previously discussed in relation with FIG. 3.

Figure 6:
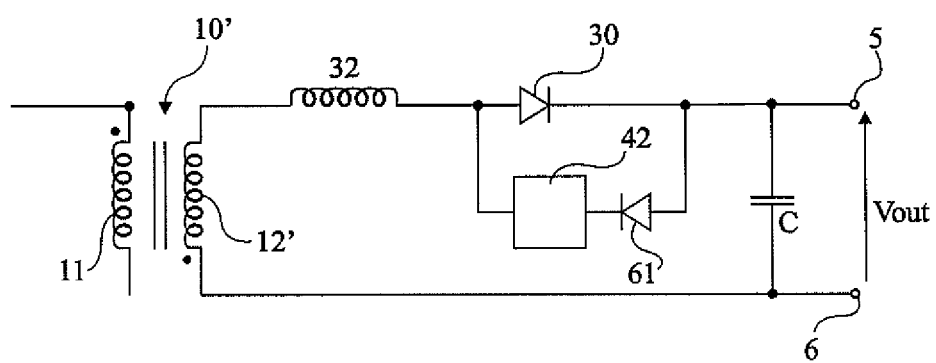
FIG. 6 partially shows still another embodiment of a switch-mode converter.

FIG. 6 partially shows another embodiment applied to a so-called flyback converter. As compared with the converter of FIG. 1, the phase point of secondary winding 12' of transformer 10' is inverted and free wheel diode 34 is suppressed. Circuit 4' is placed across diode 30. This amounts to connecting diode 61 and circuit 42 in series, in parallel with diode 30. The operation of the assembly of FIG. 5 can be induced from what has been discussed previously. FIG. 6 illustrates a variation according to which the respective positions of diode 61 and of circuit 42 have been inverted with respect to the previous assemblies.

Various embodiments have been described. Different alterations, modifications and improvements will occur to those skilled in the art. In particular, the dimensions to be given to the different components and especially to resistors R55 and R57 and to element 43 depend on the application and on the maximum voltage desired in reverse. Further, although the present invention has been described in relation with positive voltages Vin and Vout, it easily transposes to negative voltages. Moreover, a MOS technology may be used for amplifier 51 and switch 59, rather than a bipolar technology. Finally, although the present invention has been described in relation with a diode 34 (or 30), circuit 42 may be associated with any switch (for example, a MOS transistors, an IGBT transistor, etc.) of the switch-mode power supply, diode 30 or 34 being a type of self-controlled switch.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A switch-mode converter comprising:
   an inductive transformer having a secondary winding associated with at least one first switch,
   at least one first diode in series with a capacitive element being connected in parallel with the first switch, and
   an active circuit connected in parallel with said capacitive element for limiting a voltage thereacross, said active circuit comprising:
      a transistor connected in parallel with the capacitive element; and
      an amplifier configured to control the transistor, connected in parallel with the capacitive element, in a linear state based on a voltage across the capacitive element, a first input of the amplifier being coupled to a midpoint of a resistive dividing bridge coupled in parallel with the capacitive element, and a second input of the amplifier being connected, by a voltage source, to one terminal of the capacitive element, wherein the first diode, the capacitive element and the active circuit are configured to limit a voltage across the first switch to a plateau voltage.

2. The switch-mode converter of claim 1, wherein the transistor is a bipolar transistor having its collector and emitter coupled across the capacitive element and having a base coupled to an output of the amplifier.

3. The switch-mode converter of claim 1, wherein said first switch is in series with said secondary winding between two output terminals of the converter.

4. The switch-mode converter of claim 2, wherein a second switch is in series with said secondary winding between two output terminals of the converter, said first switch being coupled in parallel with this series association.

5. The switch-mode converter of claim 4, wherein a second diode connects a junction point of the secondary winding and of the second switch to a junction point of the capacitive element and of the first diode.

6. A switch-mode converter comprising:
   a transformer having a secondary winding associated with at least one first switch;
   a first diode in series with a capacitive element, the first diode and the capacitive element connected in parallel with the first switch;
   a second switch in series with the secondary winding of the transformer to form a series combination, the first switch being connected in parallel with the series combination; and
   an active circuit connected in parallel with the capacitive element, the active circuit comprising:
      a controllable element connected in parallel with the capacitive element and configured to limit a voltage across the capacitive element; and
      a sensing circuit configured to sense the voltage across the capacitive element and to control the controllable element, connected in parallel with the capacitive element, in a linear state in response to the sensed voltage, wherein the first diode, the capacitive element and the active circuit are configured to limit a voltage across the first switch to a plateau voltage.

7. The switch-mode converter as defined in claim 6, wherein the controllable element comprises a transistor.

8. The switch-mode converter as defined in claim 6, wherein the sensing circuit has a threshold voltage for controlling the controllable element.

9. The switch-mode converter as defined in claim 6, wherein the sensing circuit comprises an amplifier having a first input connected to a resistive divider and a second input connected to a voltage source, the resistive divider being connected across the capacitive element.

10. The switch-mode converter as defined in claim 6, further comprising a second diode connected between a junction point of the secondary winding and the second switch, and a junction point of the capacitive element and the first diode.

11. The switch-mode converter as defined in claim 6, wherein the first switch is connected in series with the secondary winding between two output terminals of the converter.

12. The switch-mode converter as defined in claim 9, wherein the controllable element comprises a bipolar transistor having its collector and emitter coupled across the capacitive element and having a base coupled to an output of the amplifier.

13. A method for limiting overvoltage in a switch-mode converter, comprising:
   providing a transformer having a secondary winding associated with a first switch, and a first diode in series with a capacitive element, the first diode and the capacitive element connected in parallel with the first switch;
   sensing a voltage across the capacitive element using an active circuit connected in parallel with the capacitive element; and
   controlling the voltage across the capacitive element in response to the sensed voltage, using a controllable element of the active circuit, wherein the controllable element is connected in parallel with the capacitive element and is controlled in a linear state by the sensed voltage, wherein the first diode, the capacitive element and the active circuit limit a voltage across the first switch to a plateau voltage.

14. The method as defined in claim 13, wherein the controllable element comprises a bipolar transistor.

15. The method as defined in claim 13, wherein controlling the voltage comprises controlling the controllable element in response to the sensed voltage crossing a threshold.

16. The method as defined in claim 13, wherein sensing the voltage across the capacitive element comprises sensing the voltage with an amplifier having a first input coupled to a resistive divider and a second input coupled to a voltage source, the resistive divider being coupled across the capacitive element, and wherein an output of the amplifier controls the controllable element.

* * * * *